(12) United States Patent
Mukherjee et al.

(10) Patent No.: US 11,122,450 B2
(45) Date of Patent: Sep. 14, 2021

(54) METHODS, USER EQUIPMENT AND NETWORK NODE FOR PERFORMING CHANNEL STATE MEASUREMENTS (71) Applicant: Telefonaktiebolaget LM Ericsson (publ), Stockholm (SE)

(72) Inventors: Amitav Mukherjee, Fremont, CA (US); Jung-Fu Cheng, Fremont, CA (US); Sorour Falahati, Stockholm (SE); Havish Koorapaty, Saratoga, CA (US); Daniel Larsson, Lund (SE); Yu Yang, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/763,269

(22) PCT Filed: Sep. 23, 2016

(86) PCT No.: PCT/EP2016/072703
§ 371 (c)(1),
(2) Date: Mar. 26, 2018

(87) PCT Pub. No.: WO2017/050973
PCT Pub. Date: Mar. 30, 2017

(65) Prior Publication Data
US 2018/0279144 A1      Sep. 27, 2018

Related U.S. Application Data

(60) Provisional application No. 62/232,899, filed on Sep. 25, 2015.

(51) Int. Cl.
*H04W 24/08* (2009.01)
*H04L 5/00* (2006.01)
(Continued)

(52) U.S. Cl.
CPC .......... *H04W 24/08* (2013.01); *H04B 7/0626* (2013.01); *H04B 17/26* (2015.01);
(Continued)

(58) Field of Classification Search
CPC ..... H04W 24/08; H04W 24/10; H04W 88/02; H04B 7/0626; H04B 17/309; H04B 17/26; H04B 17/382; H04B 17/24; H04L 5/0048
See application file for complete search history.

(56) References Cited

U.S. PATENT DOCUMENTS 6,429,736 B1 *   8/2002   Parry ................. H03F 1/3247
                                               330/149
10,356,793 B2 *  7/2019   Kim .................. H04L 5/0053
(Continued)

FOREIGN PATENT DOCUMENTS

CN     102835084 A     12/2012
CN     104579518 A     4/2015
(Continued)

OTHER PUBLICATIONS

3GPP, 3rd Generation Partnership Project; Technical Specification Group Radio Access Network; Evolved Universal Terrestrial Radio Access (E-UTRA); Physical channels and modulation (Release 11); 3GPP TS 36.211, V11A.0 (Sep. 2013).
(Continued)

*Primary Examiner* — Hassan Kizou
*Assistant Examiner* — Abdullahi Ahmed
(74) *Attorney, Agent, or Firm* — Coats & Bennett, PLLC (57) ABSTRACT

The invention refers to determining a channel state performed at a user device, UE (12), of a mobile network, comprising determining (S21) one or a plurality of time intervals that may be used for channel measurements, performing (S22) a plurality of signal power measurements
(Continued)

associated each to one of the time intervals to be used for channel measurement and generating a channel state information as a function of the plurality of the signal power measurements; the invention further refers to generating (S11) an information comprising an indication a plurality of time intervals that may be used for received signal power measurements to be sent from an access node, eNB (14) to the UE (12), and evaluating a measurement report received from the UE (12), wherein the report comprises received signal power measurements associated each to one of the time intervals; the invention further refers to a corresponding UE (12), eNB (14) and to corresponding computer programs.

22 Claims, 6 Drawing Sheets (51) Int. Cl.
*H04B 17/309* (2015.01)
*H04B 17/26* (2015.01)
*H04B 7/06* (2006.01)
*H04W 24/10* (2009.01)
*H04B 17/24* (2015.01)
*H04B 17/382* (2015.01)
*H04W 88/02* (2009.01)

(52) U.S. Cl.
CPC ......... *H04B 17/309* (2015.01); *H04L 5/0048* (2013.01); *H04W 24/10* (2013.01); *H04B 17/24* (2015.01); *H04B 17/382* (2015.01); *H04W 88/02* (2013.01)

(56) References Cited

U.S. PATENT DOCUMENTS

| | | | | |
|---|---|---|---|---|
| 10,674,436 | B2* | 6/2020 | Dinan | H04L 5/001 |
| 2002/0075825 | A1 | 6/2002 | Hills et al. | |
| 2012/0176924 | A1* | 7/2012 | Wu | H04W 52/365 |
| | | | | 370/252 |
| 2013/0210435 | A1* | 8/2013 | Dimou | H04W 36/0085 |
| | | | | 455/436 |
| 2014/0211656 | A1* | 7/2014 | Hu | H04B 7/024 |
| | | | | 370/252 |
| 2014/0241223 | A1* | 8/2014 | Takeda | H04L 5/001 |
| | | | | 370/280 |
| 2014/0286280 | A1 | 9/2014 | Seo et al. | |
| 2016/0212752 | A1* | 7/2016 | Xu | H04W 72/08 |
| 2016/0218832 | A1* | 7/2016 | Dabeer | H04L 1/1621 |
| 2017/0048738 | A1* | 2/2017 | Wang | H04W 24/10 |
| 2017/0048772 | A1* | 2/2017 | Gheorghiu | H04W 36/14 |
| 2017/0245272 | A1* | 8/2017 | Li | H04W 72/04 |
| 2017/0272956 | A1 | 9/2017 | Xu et al. | |
| 2017/0318580 | A1* | 11/2017 | Park | H04L 5/0053 |
| 2017/0332264 | A1* | 11/2017 | Mo | H04W 72/085 |
| 2017/0347365 | A1* | 11/2017 | Xu | H04W 24/10 |
| 2018/0062715 | A1* | 3/2018 | Li | H04B 7/04 |
| 2018/0070225 | A1* | 3/2018 | Soldati | H04W 72/0406 |
| 2018/0192314 | A1* | 7/2018 | Takahashi | H04W 16/14 |
| 2019/0274172 | A1* | 9/2019 | Yoon | H04W 74/0866 |

FOREIGN PATENT DOCUMENTS

| | | |
|---|---|---|
| EP | 2882254 A1 | 6/2015 |
| WO | 2011129734 A1 | 10/2011 |
| WO | 2015131694 A1 | 9/2015 |

OTHER PUBLICATIONS

3GPP, 3rd Generation Partnership Project; Technical Specification Group Radio Access Network; Evolved Universal Terrestrial Radio Access (E-UTRA); Physical layer procedures (Release 11); 3GPP TS 36.213, V11.4.0 (Sep. 2013).
3GPP, ETSI Technical Specification; LTE; Evolved Universal Terrestrial Radio Access (E-UTRA); Radio Resource Control (RRC); Protocol specification; 3GPP TS 36.331, V11.51) (Release 11).
Ericsson, "Further discussion on support of CSI Measurement and Reporting for LAA", Discussion and Decision, 3GPP TSG RAN WG1 Meeting #80bis, Belgrade, Serbia, Apr. 20, 2015, pp. 1-4, R1-152011.
3rd Generation Partnership Project, "3rd Generation Partnership Project; Technical Specification Group Radio Access Network; Evolved Universal Terrestrial Radio Access (E-UTRA); Physical layer procedures (Release 12)", Technical Specification, 3GPP TS 36.213 V12.5.0, Mar. 1, 2015, pp. 1-239, 3GPP, Valbonne, FR.
Ericsson, Discussion on CSI Measurement and Reporting for LAA, 3GPP TSG RAN WG1 meeting #82, Beijing, China, Aug. 24-28, 2015, R1-154637.
ITL, "On the CSI measurement and reports for LAA", 3GPP TSG RAN WG1 Meeting #82, Beijing, China, Aug. 24, 2015, pp. 1-5, R1-154542, 3GPP.

* cited by examiner

METHODS, USER EQUIPMENT AND NETWORK NODE FOR PERFORMING CHANNEL STATE MEASUREMENTS

TECHNICAL FIELD

The present disclosure generally relates to communicating on unlicensed spectrum. More specifically, and without limitation, devices and methods are provided for channel state information measurements on unlicensed carriers.

BACKGROUND

In a typical cellular system, also referred to as a wireless communications network or as radio access network, wireless (communication) terminals, also known as mobile stations or user equipments (UEs) communicate via a radio access network, RAN, to one or more core networks. The radio access network may comprise access points, AP, or base stations, BS that communicate with the user equipments, UEs, by means of radio signals and provide access to the core network.

The Third Generation Partnership Project, 3GPP, has established a plurality of generations of mobile communication standards. The Universal Mobile Telecommunications System, UMTS, is a third generation mobile communication system, which evolved from the Global System for Mobile Communications, GSM, to provide mobile communication services based on Wideband Code Division Multiple Access, WCDMA, access technology. Long-Term Evolution, LTE, often being referred to as fourth generation, has been specified to increase the capacity and speed using a different radio interface together with core network improvements.

LTE uses orthogonal frequency division multiplexing, OFDM, in the downlink and Discrete Fourier Transform (DFT)-spread OFDM, also being referred to as single-carrier frequency-division multiple access (SC-FDMA) in the uplink. The basic LTE downlink physical resource can thus be seen as a time-frequency grid, where each resource element corresponds to one OFDM subcarrier during one OFDM symbol interval. The uplink subframe has the same subcarrier spacing as the downlink and the same number of SC-FDMA symbols in the time domain as OFDM symbols in the downlink. In the time domain, LTE downlink transmissions are organized into radio frames of 10 ms, each radio frame consisting of ten subframes of length T_subframe=1 ms. Each subframe comprises two slots of duration 0.5 ms each, and the slot numbering within a frame ranges from 0 to 19. For normal cyclic prefix, one subframe consists of 14 OFDM symbols. The duration of each symbol is approximately 71.4 μs.

The resource allocation in LTE is typically described in terms of resource blocks, where a resource block corresponds to one slot in the time domain and 12 contiguous subcarriers in the frequency domain. A pair of two adjacent resource blocks in time direction is known as a resource block pair. Resource blocks are numbered in the frequency domain, starting with 0 from one end of the system bandwidth.

Downlink transmissions are dynamically scheduled, i.e., in each subframe the base station transmits control information about which terminals data is transmitted to and upon which resource blocks the data is transmitted, in the current downlink subframe. The downlink subframe also contains common reference symbols, which are known to the receiver and used for coherent demodulation of e.g. the control information.

Conventionally, the spectrum licensed by mobile carriers for cellular networks (e.g., Long-Term Evolution, LTE) and the unlicensed spectrum used for wireless local-area networks (WLANs) have been largely independent. As the number of mobile nodes and the data rates per mobile node increase, there has been a growing interest in smaller cells transmitting LTE channels in bands (or carriers) of the unlicensed spectrum.

Examples of unlicensed spectrum bands are the commonly-called "WiFi bands" around 2.4 GHz, 5 GHz and 60 GHz. These are free to use provided that certain regulatory constraints are fulfilled when transmitting on them. These bands are not dedicated to a specific radio-access technology (RAT).

Licensed-Assisted Access via LTE (LAA-LTE) has recently been proposed for LTE co-existence on unlicensed carriers with, e.g., WLAN. This means that a user equipment (UE) is connected to an LTE network on a licensed spectrum, also being referred to as primary carrier. In addition, it can also be connected to the same network on an unlicensed spectrum, also being referred to as secondary carrier.

A possibility to reliably utilize the unlicensed spectrum is to transmit essential control signals and channels on a licensed carrier. Thus, a UE may be connected to a Primary Cell in the licensed band (PCell) and one or more Secondary Cells in the unlicensed band. Such Secondary Cell will also being referred to as licensed-assisted access secondary cell (LAA SCell).

Figure 1:
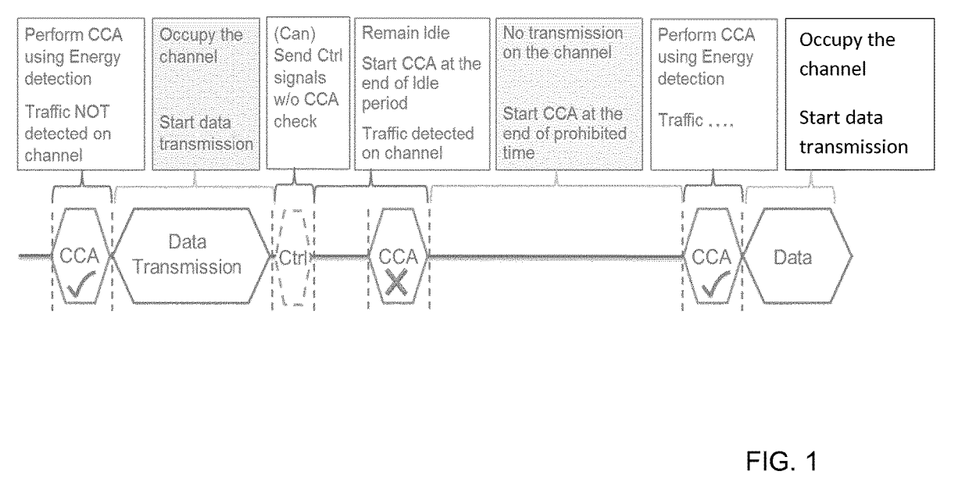
FIG. 1 illustrates an exemplary LBT mechanism associated to LAA.

Data transmission on an unlicensed band is to be typically controlled by a Listen-Before-Talk (LBT) mechanism. In typical deployments of WLAN, carrier sense multiple access with collision avoidance (CSMA/CA) is used for medium access. This means that the channel is sensed to perform a clear channel assessment (CCA), and a transmission is initiated only if the channel is declared as Idle. In case the channel is declared as Busy, the transmission is essentially deferred until the channel is deemed to be Idle. When the range of several base stations or access points (APs) using the same frequency overlap, this means that all transmissions related to one AP might be deferred in case a transmission on the same frequency to or from another AP which is within range can be detected. Effectively, this means that if several APs are within range, they will have to share the channel in time, and the throughput for the individual APs may be severely degraded. An exemplary illustration of the listen-before-talk (LBT) mechanism is shown in FIG. 1.

In cellular communication systems, downlink, DL, pilots, reference signals (RS) or so-called cell specific reference symbols (CRS) of predefined and known characteristics are regularly transmitted by the infrastructure access points or base stations of the radio access network to the user equipments. The reference signals are used (e.g. measured) by both idle and active user equipments, e.g. for the purpose of mobility measurements, cell association, and channel estimation for certain transmission modes.

According to 3GPP Technical Specification 36.213, current version 12.5.0, in the following being referred to as TS 36.213, the UE shall perform a periodic and/or an aperiodic reporting of channel state indicators. This information may be used by the radio access network for scheduling decisions (e.g. comprising a selection of a modulation and coding scheme, MCS, to be used by the UE for transmitting a certain transport block, and a resource block, RB, allocation to the UE) to ensure an efficient usage of radio resources.

According to 3GPP TS 36.213, section 7.2, the CSI to be reported by the UE comprises a so-called Channel Quality Indicator, CQI, and may comprise further indicators such as a so-called Pre-coding Matrix Indicator, PMI, and a so-called Rank Indicator, RI. The UE shall report to the radio terminating node (eNB) of the radio access network, the highest wideband CQI value within the range of suitable CQI values matching to the instantaneous radio conditions experienced by the UE given the receiver capabilities of the UE, resulting into a block error rate, BLER, equal or below 10%. The BLER therein may represent a ratio of a number of erroneous data blocks and a corresponding total number of received data blocks. The radio access network will use the reported CQI value as one input to its scheduling algorithm. As defined in above-cited TS 36.213, Table 7.2.3-1, there are 15 CQI values from 0 to 15 each associated to a certain efficiency, wherein the efficiently increases with the value.

Such CSI measurements may be based on Channel State Information Reference Signals (CSI-RS) or on CRS. Channel State Information Interference Measurement (CSI-IM) can be used for interference measurements in so-called transmission mode 10. Furthermore, CRS or discovery reference signals (DRS) can be used as basis for radio resource management (RRM) measurement quantities such as RSRP and RSRQ, while CSI-RS may be utilized for RSRP. Within current LTE specifications, the UE may average CRS-based measurements across multiple subframes, as well as average CSI-RS and CSI-IM measurements across different CSI-RS and CSI-IM occasions, and for RRM measurements to be averaged across multiple DRS occasions. Reference signal received power (RSRP) is defined as the linear average over the power contributions (in [W]) of the resource elements that carry cell-specific reference signals within the considered measurement frequency bandwidth. The RSRQ is defined as the ratio N×RSRP/(E-UTRA carrier RSSI), where N is the number of RBs of the E-UTRA carrier RSSI measurement bandwidth. The measurements in the numerator and denominator shall be made over the same set of resource blocks. Carrier Received Signal Strength Indicator (RSSI), comprises the linear average of the total received power (in [W]) observed only in certain OFDM symbols of measurement subframes, in the measurement bandwidth, over N number of resource blocks by the UE from all sources, including co-channel serving and non-serving cells, adjacent channel interference, thermal noise etc. If higher layers indicate measurements based on DRS, RSSI is measured from all OFDM symbols of the DL part of the subframes in the configured DRS occasions.

SUMMARY

It is an insight of the present application that CSI, RRM measurements, and/or any other measurements that rely on DL reference signals or on other channels across multiple subframes according to the prior art may result in an unsufficient accuracy of measurements at the UE CSI determination associated to LAA:

In LAA, reference signals may not be present as specified for LTE due to the need to perform LBT prior to DL transmission, and/or the power on the CRS/CSI-RS of different subframes may vary, e.g. if power back-off is applied to all REs in a subframe when higher-order modulation is utilized, or dynamic power sharing across multiple DL component carriers is uses in the case of carrier aggregation.

It is thus an object to improve above-mentioned measurements.

According to an embodiment, it is proposed a method for determining a channel state performed at a user device, UE, of a radio access network, comprising:

determining one or a plurality of time intervals that may be used for channel measurements, performing a plurality of signal power measurements associated each to one of the time intervals to be used for channel measurement, and generating a channel state information as a function of the plurality of the signal power measurements.

In a further embodiment, it is proposed a method performed at a network node, eNB, of a radio access network, comprising:

generating an information comprising an indication a plurality of time intervals that may be used for received signal power measurements to be sent to the UE, and evaluating a measurement report received from the UE, wherein the report comprises received signal power measurements associated each to one of the time intervals.

In a further embodiment, it is proposed UE comprising:

a determination module adapted for determining one or a plurality of time intervals that may be used for channel measurements, and a measurement module adapted for performing a plurality of signal power measurements associated each to one of the time intervals to be used for channel measurements, and adapted for generating a channel state information as a function of the plurality of the signal power measurements.

In a further embodiment, it is proposed an eNB, of a radio access network, comprising:

a time interval indication module adapted to generate an information comprising an indication a plurality of time intervals that may be used for received signal power measurements, and a channel state evaluation module adapted for an evaluation of a measurement report received from the UE, wherein the report comprises received signal power measurements signal power measurements associated each to one of the time intervals.

Further embodiments concern computer programs comprising portions of software codes in order to implement the methods as described above when operated by a respective processor of the UE, or the eNB. The computer programs can be stored on a computer readable medium. The computer-readable medium can be a permanent or rewritable memory within the UE or eNB, or located externally. The respective computer program can be also transferred to the respective UE or eNB for example via a cable or a wireless link as a sequence of signals.

In the following, detailed embodiments of the present invention shall be described in order to give the skilled person a full and complete understanding. However, these embodiments are illustrative and not intended to be limiting.

BRIEF DESCRIPTION OF THE DRAWINGS

The accompanying drawings illustrate several aspects of the disclosure, and together with the description serve to explain the principles of the disclosure.

DETAILED DESCRIPTION

Figure 3:
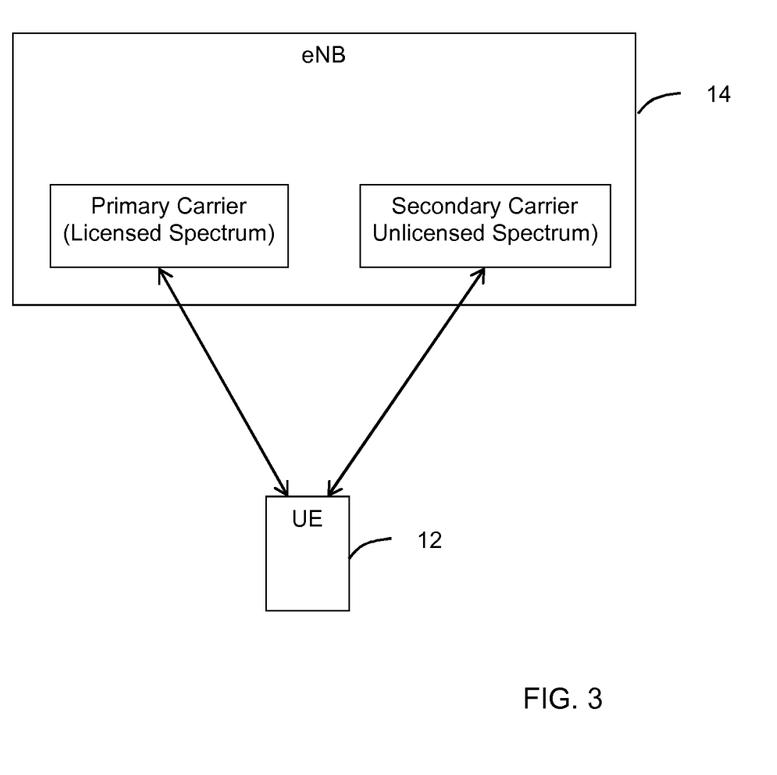
FIG. 3 illustrates a radio network comprising an access point or eNB communicating to a UE by means of a PCell and an SCell.

As shown in FIG. 3 the example network may include one or more instances of wireless communication devices 12 (e.g. conventional user equipments (UE), or machine type communication (MTC) or machine-to-machine (M2M) equipments) and one or more radio access nodes. In the following example, the wireless communication devices 12 are being referred to as UEs and the radio access node 14 will be referred to as eNodeB or eNB 14.

The UE 12 may be connected to a Primary Cell in the licensed band (PCell) and one or more Secondary Cells in the unlicensed band. Such Secondary Cell will also being referred to as licensed-assisted access secondary cell (LAA SCell).

The eNB 14 is capable of communicating with UE 12 along with any additional elements suitable to support communication between wireless communication devices or between a wireless communication device and another communication device (such as a landline telephone). Although the illustrated UE 12 may represent communication devices that include any suitable combination of hardware and/or software, these devices may, in particular embodiments represent devices such as the example wireless communication device illustrated in greater detail by FIG. 6 and FIG. 7. Similarly, although the illustrated eNB 14 may represent a network node that include any suitable combination of hardware and/or software, this node may, in particular embodiments, represent a device such as the example base station illustrated in greater detail by FIG. 8 and FIG. 9. It should be understood that the cellular communications network may include any number of radio access nodes serving any number of wireless communication devices. The eNB 14 is further connected to a core network (not shown).

Figure 2:
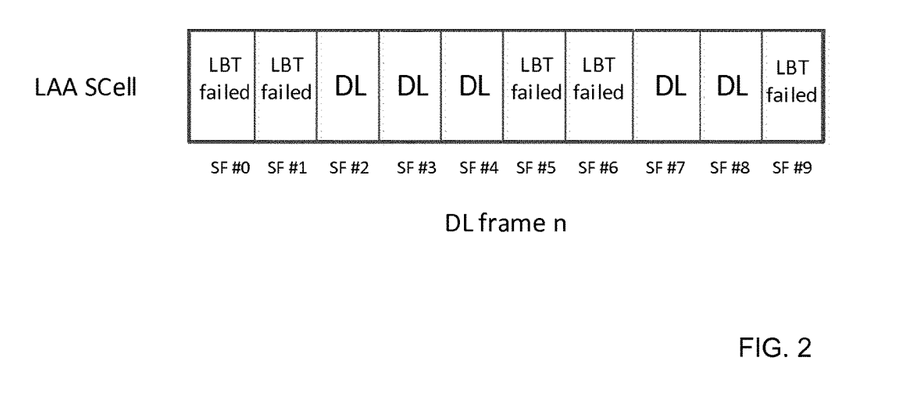
FIG. 2 illustrates an exemplary LAA SCell DL frame.

FIG. 2 shows an exemplary LAA DL frame comprising 10 subframes, wherein some of the subframes may not be used for DL transmission of the eNB due to occupancy by non LTE devices (LBT failed). By way of the shown example, subframes #0, #1, #5, #6, and #9 thus may not be used for channel measurements in the UE.

Figure 4:
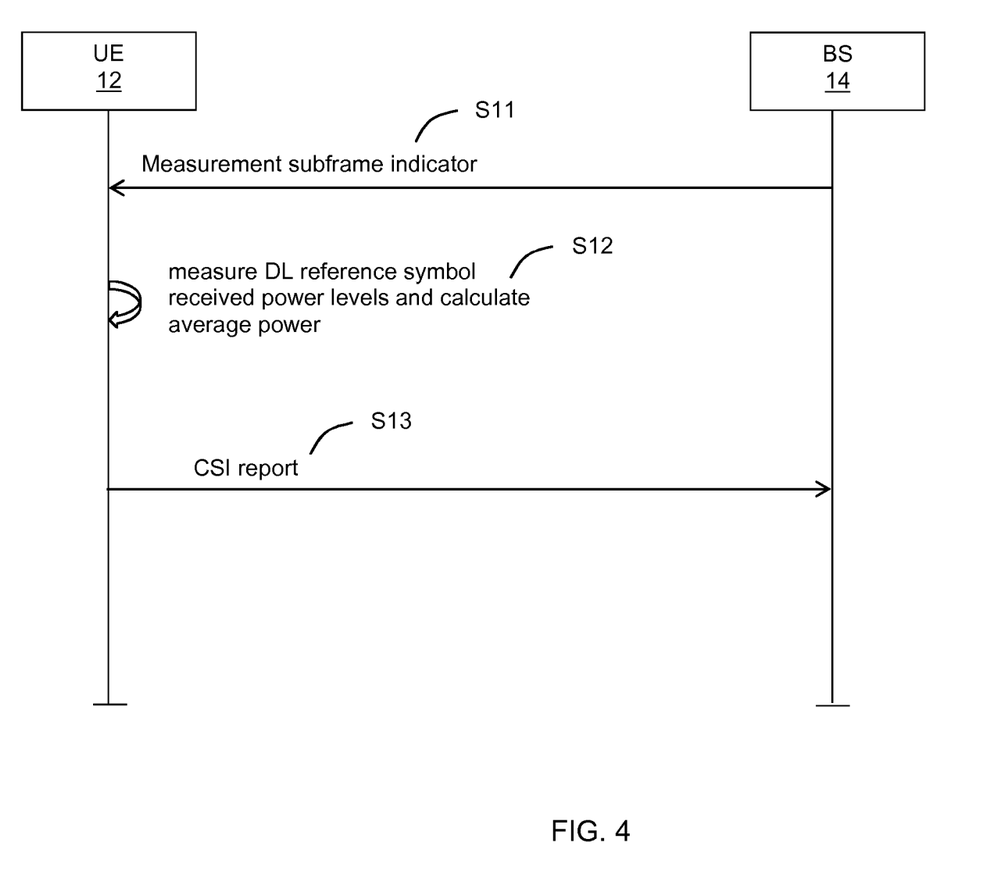
FIG. 4 illustrates a first sequence of messages and steps performed by a wireless device and a base station for channel state measurements.

In an embodiment a depicted in FIG. 4, in first step S11, the eNB sends an indication to the UE indicative of a plurality of time intervals or time slots that may be used for channel measurements. With the example of FIG. 2, the eNB may send identifiers of subframes #2, #3, #4, #7, and #8 of frame n. Alternatively, the eNB may send an indication of time intervals that may not be used for channel measurements.

In a second step S12, the UE performs a channel measurement within the time intervals to be used for channel measurement, wherein each (time interval) measurement is associated to one of these time intervals.

In a third step S13, the UE may provide a measurement result to the eNB, wherein the measurement result may be function of the plurality of these measurements. The function may be an averaging function determining an average over the plurality of the time interval measurements.

A time interval may be an OFDM symbol duration, a subframe or transmission time interval (TTI), or any suitable time interval.

In an embodiment the indication sent by the eNB comprises a plurality of identifiers identifying explicit time intervals (e.g. a plurality of subframe identifiers) to be used for measurements. Additionally or alternatively, the indication comprises a set of time intervals (subframes) or a range of valid subframes over which a measurement may be performed. The range of valid subframes may include subframes in which the UE was not scheduled for Physical Downlink Shared Channel (PDSCH) reception.

A range of valid subframes may span within a download (DL) transmit burst, or across distinct DL transmit bursts. The eNB may also indicate a subset of symbols out of the set of symbols within the valid subframes on which measurement averaging should be performed.

The measurement may be performed according to a CSI metric such as CQI. Another example is a RSSI measurement. The subframes valid as measurement subframes for averaging may be related in time to the DL reference subframe for which the CSI represents the quality of the channel.

In an embodiment the indication is transmitted to the UE over a physical downlink control channel (PDCCH) by means of Downlink Control Information (DCI) that may further provide to the UE information such as UL scheduling grants. Thereto, one or a plurality of new fields may be in the DCI of resource grants.

Alternatively, the indication may be transmitted by means of aperiodic CSI requests or may be broadcasted in the common search space of control channels.

In an embodiment, the eNB 14 optimizes a scheduling of UEs 12 with higher-order modulated data (e.g. 64QAM or 256QAM) to reduce a variation of power across subframes.

In a further embodiment UEs scheduled with higher order modulation are grouped together within the same burst. Further the UEs may be down-selected based on which higher order modulations that are scheduled, e.g. between 64QAM or 256QAM. As an example, UEs with higher-order modulated data may be served in the same subframe(s) of a DL burst, such that the remaining subframes of the burst are of the same power. In another example, UEs with higher-order modulated data are served on a licensed carrier.

In an embodiment the eNB avoids scheduling higher-order modulated data in subframes, where the UE expects a presence of reference signals (CSI-RS and/or CSI/IM). The eNB may (explicitly or implicitly) indicate to the UE that higher-order modulated data is not scheduled in these subframes.

Figure 5:
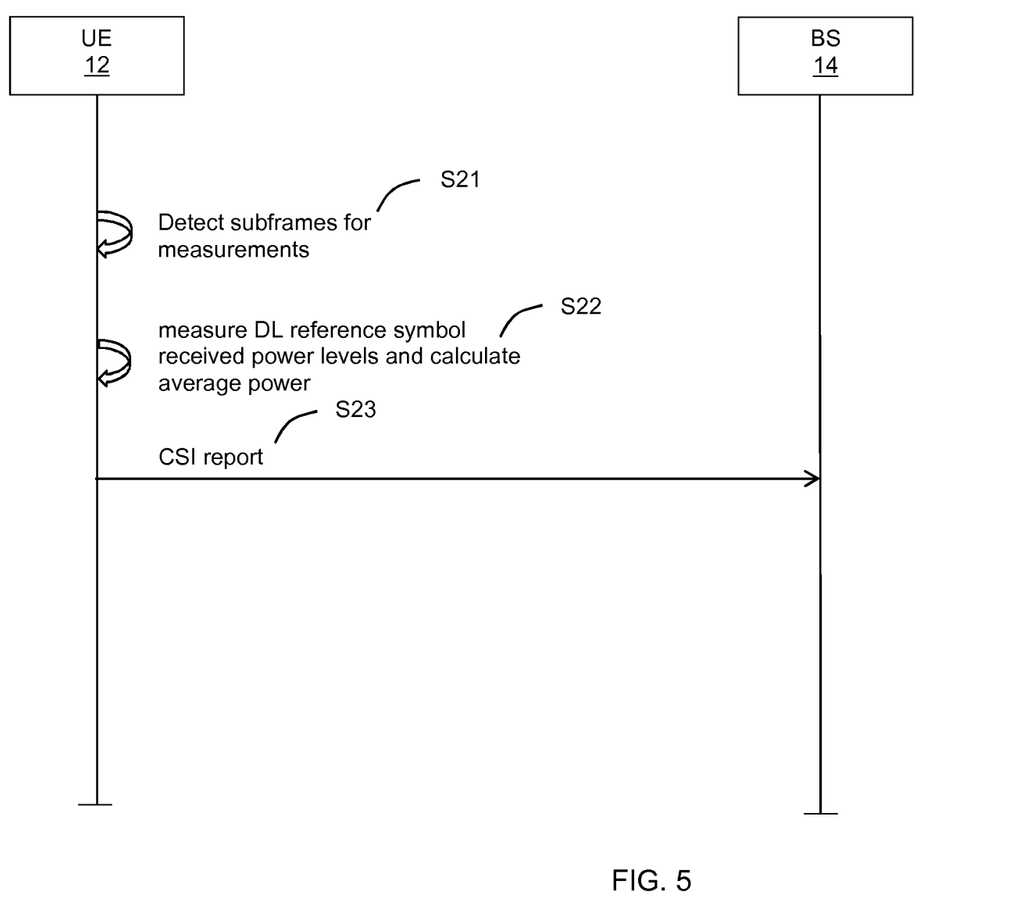
FIG. 5 illustrates a second sequence of messages and steps performed by a wireless device and a base station for channel state measurements.

In an embodiment, as depicted in FIG. 5, the UE 12 autonomously determines which DL subframes are to be used for channel measurements.

Thereto, in a first step S21, the UE may detect time intervals wherein an estimated received power deviates from the measured received power (e.g. by detecting that the power difference between the estimated received power and the measured power exceeds a certain power threshold) and exclude such time intervals from the channel measurements.

In a second step S22, the UE may perform measurements as described in step S11 of FIG. 4.

In a third step S23, similarly to step S13 of FIG. 4, the UE may provide a measurement result to the eNB, wherein the measurement result may be function of the plurality of these measurements. The function may be an averaging function determining an average over the plurality of the time interval measurements.

In an embodiment, the estimated received power is determined based on a set of previous received subframes (e.g. an average of certain number of previous received subframes.

In an embodiment, the UE 12 performs an RSRP measurement on the CRS or CSI-RS and compares this to an average value of a set of previously received subframes. If the power difference is too large (exceeds a certain or defined threshold), the subframe is excluded from averaging.

In an embodiment, a subframe in which the UE 12 is scheduled with higher-order modulated data is excluded from the set of subframes over which measurements are averaged.

In another example, measurement averaging at UE 12 is performed taking into account a power back-off when the UE is scheduled with higher-order modulated data. For example, some scaling/calibration can be performed based on the power back-off due to higher-order modulation, to include these subframes together with subframes without power back-off, when averaging measurements.

In an embodiment, the UE 12 autonomously determines whether power variation has occurred based on the number of SCells within a TTI for which it is scheduled to receive data, or the number of SCells on which it has detected the presence of CRS or an initial signal. Measurement averaging may then performed across subframes which had the same estimated number of active SCells.

In an embodiment, measurement averaging at the UE 12 is performed while taking into account the number of SCells within a TTI for which it is scheduled to receive data, or the number of SCells on which it has detected the presence of CRS or an initial signal. For example, some scaling/calibration can be performed based on the number of SCells when doing measurement averaging.

In an embodiment, the eNB 14 may avoid scheduling higher-order modulated data in subframes where the UE expects the presence of CSI-RS and/or CSI/IM, so that the UE 12 may assume that higher-order modulated data are not scheduled in the subframes. If this scheduling constraint is applied for all CSI-RS/IM transmissions from eNB, additional explicit signaling for this purpose may not be needed.

Figure 6:
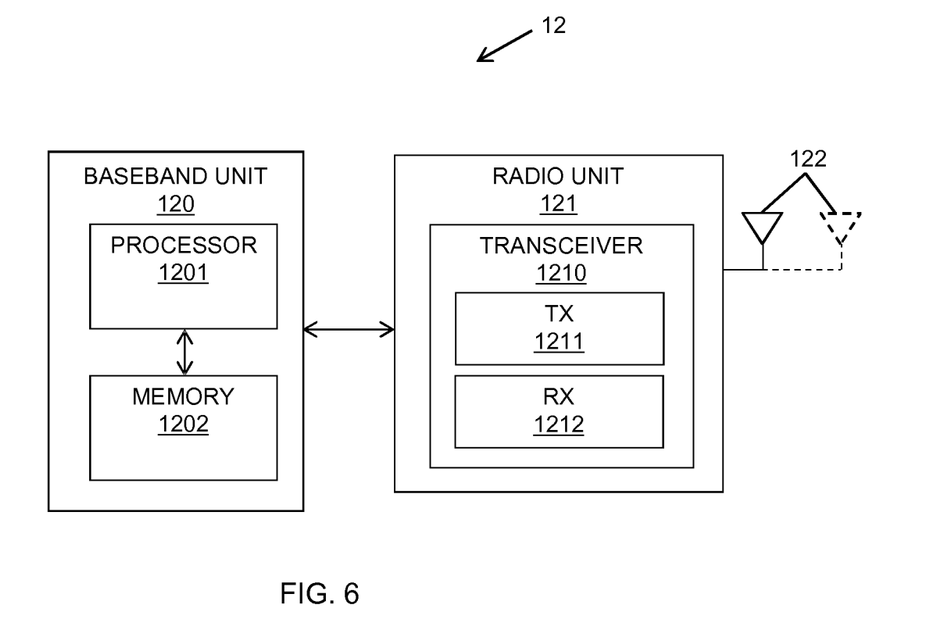
FIG. 6 is a block diagram of structural units of the wireless device according to some embodiments of the present application.

As shown in FIG. 6, the example wireless communication device or UE 12 includes a baseband unit 120, a radio unit 121 and one or a plurality of antennas 122. The baseband unit 120 is coupled to the radio unit 121. The baseband unit 120 comprises a device processor 1201 and a device memory 1202. The radio unit 121 comprises a transceiver 1210 that is coupled to the one or a plurality of antennas 122. The transceiver comprises a transmission circuit TX 1211 and a receiver circuit RX 1212. In particular embodiments, some or all of the functionality described above as being provided by UEs, MTC or M2M devices, and/or any other types of wireless communication devices may be provided by the device processor 1201 executing instructions stored on a computer-readable medium, such as the device memory 1202. Alternative embodiments of the wireless communication device may include additional components beyond those shown here that may be responsible for providing certain aspects of the device's functionality, including any of the functionality described above and/or any functionality necessary to support the solution described above.

Figure 7:
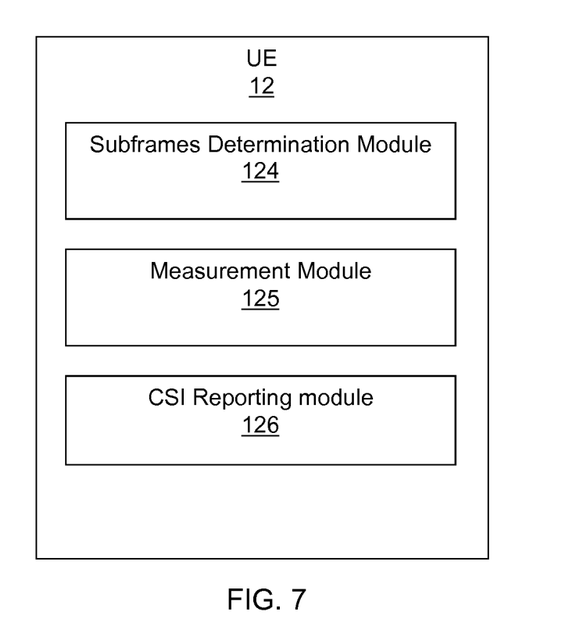
FIG. 7 is a block diagram of functional units of the wireless device according to some embodiments of the present application.

As shown in FIG. 7, the example UE 12 includes the following exemplary functional units:
 a subframe determination module 124 adapted identify a plurality of time intervals or time slots that may be used for channel measurements. Such identification may be performed autonomously by the UE as describe above or by an evaluation of indication messages received from the eNB;
 a measurement module 125 adapted for performing channel measurements (CSI measurements) within the time intervals identified to be used for channel measurement;
 a measurement reporting module 126 adapted to perform measurement (CQI) reporting to the eNB as configured by the network.

Figure 8:
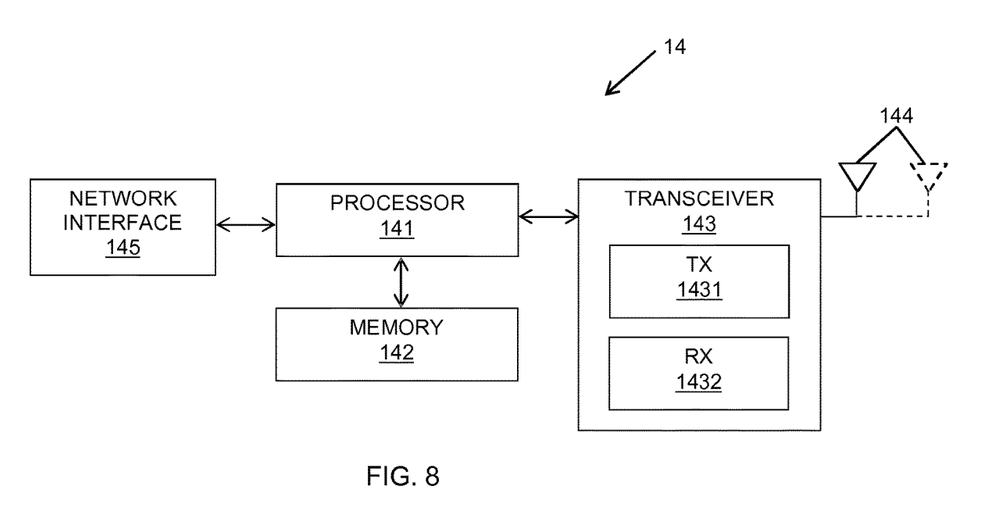
FIG. 8 is a block diagram of structural units of the base station according to some embodiments of the present application.

As shown in FIG. 8, the example network node or eNB 14 includes a node processor 141, a node memory 142, a node transceiver 143, one or a plurality of node antennas 144 and a network interface 145. The node processor 141 is coupled to the node memory 142, to the network interface 145 and the node transceiver 143 that is coupled to the one or the plurality of node antennas 144. The node transceiver 143 comprises a transmission circuit TX 1431 and a receiver circuit RX 1432. In particular embodiments, some or all of the functionality described above as being provided by a base station, a node B, an enhanced node B, and/or any other type of network node may be provided by the node processor executing instructions stored on a computer-readable medium, such as the node memory 142. Alternative embodiments of the radio access node may include additional components responsible for providing additional functionality, including any of the functionality identified above and/or any functionality necessary to support the solution described above.

Figure 9:
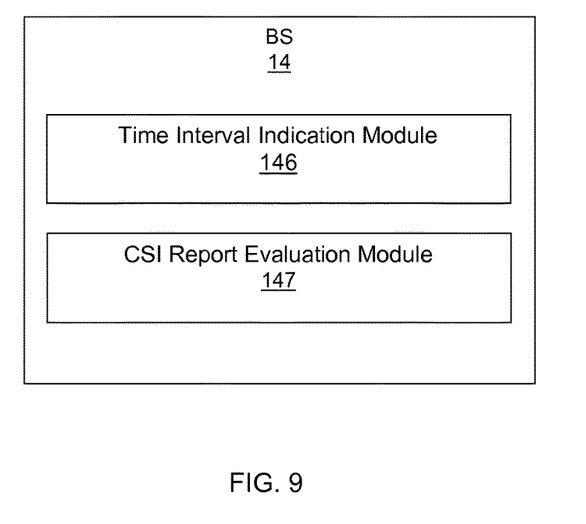
FIG. 9 is a block diagram of functional units of the base station according to some embodiments of the present application.

As shown in FIG. 9, the example eNB 14 includes the following exemplary functional units:
 a time interval indication module 146 adapted to generate an information comprising an indication a plurality of time intervals or time slots that may be used for channel measurements, the information to be sent to the UE;
 a CSI report evaluation module 147 adapted for evaluation a measurement report (CSI report) received from the UE.

In the following some considerations and proposals are presented, that may be based or supplement the previous description and/or provide some further aspects.

CSI Feedback Based on CSI-RS and CSI-IM:

The CSI-RS framework is a UE specific framework, i.e. a specific UE is not aware of other UEs CSI-RS. Furthermore, the CSI-RS are currently configured by a specific periodicity and offset. In addition, there are three CSI processes defined for CSI measurements. How many CSI processes the UE supports is a UE capability. The UEs not measuring on the CSI-RS would be configured with ZP (zero power)-CSI-RS at those occasions and the PDSCH/EPDCCH mapping should function without any evident drawbacks. The same approach is also used for CSI-IM.

In a first scenario it is considered to allowing aperiodic presence of CSI-RS. In this scenario the eNB may indicate to the UE in some form that the CSI-RS is present in the corresponding subframe. This may need to be done for both ZP (zero power)-CSI-RS and NZP (non-zero-power)-CSI- RS. Further the same principle may apply for CSI-IM as well. For every UE that is scheduled in DL, the eNB may indicate ZP-CSI-RS for all the used REs. Currently the amount of available CSI-RS configurations may be too large to be included in a DCI message.

Therefore, a simple and reliable approach is that the UE assumes that the ZP CSI-RS, NZP-CSI-RS and CSI-IM are configured and transmitted periodically as in Rel-12. Thus not only the risk on different assumptions between eNB and UEs is avoided but also the DCI message capacity or an allowable number of CSI-RS configurations are not compromised. At the same time the UE may only perform measurements on NZP CSI-RS and CSI-IM if the eNB has been successful with the LBT; due to this an availability of such resource may in practice be aperiodic.

Thus, according to this embodiment, ZP-CSI-RS, NZP-CSI-RS and CSI-IM are periodically configured, whereas NZP-CSI-RS and CSI-IM are aperiodically present (subject to LBT).

In an embodiment, with respect to a periodicity of the CSI-RS occasion, the UE is to be configured with a rather short periodicity of CSI-RS per CSI process as the eNB can not guarantee to succeed with LBT or occupy the channel for a longer duration corresponding to CSI-RS configuration periodicity. More specifically, there may be a relationship between the transmission burst used by the eNB and the CSI-RS configuration. If the periodicity of the CSI-RS can ensure that a single CSI-RS occasion is within a transmission burst from the eNB, the CSI-RS can then occur at any time occasion within the transmission burst. The currently defined CSI-RS periodicities are 5, 10, 20, 40 and 80 ms. Two of the considered transmission duration values in the LAA discussion so far are 4 and 10 ms. A CSI-RS with a periodicity of 5 ms can be supported with a transmission duration of 10 ms. This assumes that the CSI-RS can occur in any subframe within the transmission duration. It is to be noted that DwPTS does not support CSI-RS configurations so that, if the last DL subframe is corresponding to a DwPTS subframe, a CSI-RS configuration for such a subframe may be defined. For a transmission duration of 4 ms, a new and tighter periodicity of CSI-RS may be introduced. This is to ensure that there is a CSI-RS occasion available for the UE to measure on. The UEs not measuring on the CSI-RS would be configured with ZP-CSI-RS at those occasions and the PDSCH/EPDCCH mapping should function without any evident drawbacks. The same approach can also be used for CSI-IM. Thus, according to such embodiment is proposed to introduce a CSI-RS periodicity (e.g. of 4 ms).

For aperiodic CSI reporting, when the UL grant is sent on the SCell that also triggers the aperiodic CSI report, it is easy for the eNB to ensure that CSI-RS is transmitted together with the UL grant. If, however, the UL grant indicates an aperiodic CSI-RS report for a different cell than the one the UL grant is sent on, it may not be possible to transmit NZP CSI-RS in the configured subframe for CSI-RS. One possible reason could be that after the eNB has occupied the channel due to the very short processing time available between the successful LBT on the carrier for which reporting is to be done and the transmission time of the UL grant on a different carrier. Another possibility is that the eNB has failed to access the channel due to unsuccessful LBT. In such cases the eNB would discard the corresponding aperiodic CSI report and it preferred that the UE does not affect other measurements with such noisy measurements. It may further be possible that the UE implicitly detects the presence of the CSI-RS for such situations.

A further aspect to be considered refers to a feasibility of interpolating CSI measurements across time. Within the current LTE design it is allowed for the UE to average CSI-RS and CSI-IM measurements across different CSI-RS and CSI-IM occasions. A further important aspect is to support in a good manner 64QAM and 256QAM in DL for PDSCH transmission. It may be advantageous to allow power back-off values from the maximum transmission power when the eNB schedules these higher modulation orders. Further, in a multi-carrier scenario it may be beneficial to vary the output power depending on the number of carriers that succeeded in LBT or is operated for the current TTI. If the UE would be able to measure CSI-RS in multiple subframes for which the allocated power was different from the eNB side, it may be very difficult from the eNB to utilise the CSI report as it will not be known at the eNB how the UE has constructed it. Hence, one solution is that the UE should not autonomously interpolate measurements between different NZP-CSI-RS and CSI-IM occasions, unless indicated by the eNB to do so. Since the eNB has complete knowledge of any variations in its DL transmit power, it may indicate to the UE which and how many CSI-RS occasions are suitable for measurement averaging. Alternatively, it can indicate to the UE whether higher-order modulation has been employed in the subframes where the UE expects the presence of CSI-RS and/or CSI/IM, after which the UE can either avoid measurement interpolation or take this information into account when constructing the CSI report. Thus, according to this embodiment, the UE is configured to perform CSI measurement only in the CSI reference resource. It is further configured to average CSI measurements only across different CSI reference resources, if explicitly indicated by the eNB.

Due to the LBT and limited channel occupancy time and unpredictability of the channel condition in the unlicensed spectrum, it may be preferable to update the CSI reporting as soon as possible; it may further be preferable to minimize a delay between the trigger for aperiodic report and the presence of the CSI-RS (if available due to LBT). It would be possible for the UE to always measure and simply report based on the latest measurement. Alternatively, the UE is configured to only perform the measurement when it is supposed to report CSI for a specific cell. Thereto in an embodiment it is proposed that an aperiodic CSI report for an indicated LAA SCell triggered by an UL grant is based on the NZP-CSI-RS and CSI-IM in the same subframe as the UL grant subframe. Such embodiment may have the advantage to provide for significant power saving in the UE.

CSI feedback based on CRS: One important aspect with regard to CRS-based CSI feedback is how the UE detects the presence of the CRS. Given the design target of being able to perform a single shot DRS measurement based on CRS, it should therefore be possible for the UE to implicitly detect CRS for the purpose of CSI feedback. If it is found that this is not possible, the same mechanism as proposed for CSI-RS can be reused.

Similar as for CSI-RS based CSI measurement the UE cannot assume the same power on the CRS between different subframes. Hence for CRS-based CSI feedback the UE should not interpolate CRS measurements between different subframes, unless explicitly indicated by the eNB.

Thereto in an embodiment the UE may be configurable to autonomously detect a presence of CRS for the purpose of CSI feedback.

Further, the UE may be configured such that CSI measurements are only performed in the CSI reference resource and are not to be averaged across different CSI reference resources, unless indicated or commanded by the eNB.

Considerations about a periodicity of CSI reporting (periodic versus aperiodic CSI reporting):

It may be assumed that the interference conditions are very variable on an LAA SCell over time. At the same time, considered scenarios may be low mobility scenarios. The underlying spatial properties and channel quality (if the interference conditions are excluded) is hence rather static over time. Moreover, it may be assumed that the LAA SCell will mainly be used to expand the data rate, i.e. if the eNB has large amount of DL data to schedule to the UEs the eNB will utilise the LAA SCells. Consequently, the LAA SCell will be used for a significant amount of time before the eNB has emptied its transmission buffer. Due to this, it may be unlikely that the eNB will activate LAA SCells without scheduling data on them for a long period of time.

Periodic CSI reports are mainly used to get a good starting point for the link adaptation. When data is being continuously scheduled, the resolution of the periodic CSI report is not good enough for reliable scheduling of high date rate. In addition, the reliable transmission of reference signals for CSI in a periodic manner on the unlicensed band will not be possible due to the potential lack of access to the channel. Moreover, the interference conditions may be very varying over a short amount of time in the unlicensed spectrum as the amount of available spectrum maybe very large. Therefore, it is desirable to support a lightweight aperiodic CSI report, e.g. wideband-only aperiodic CSI report to maintain a reasonable aperiodic CSI payload.

| Abbreviation | Explanation |
| --- | --- |
| CCA | Clear Channel Assessment |
| CRS | Cell-Specific Reference Signal |
| CQI | Channel Quality Indicator |
| CSI | Channel State Information |
| DCI | Downlink Control Information |
| DL | Downlink |
| DRS | Discovery Reference Signal |
| eNB | evolved NodeB, base station |
| UE | User Equipment |
| UL | Uplink |
| LAA | Licensed-Assisted Access |
| RSRP | Reference Signal Received Power |
| RSRQ | Reference Signal Received Quality |
| RS | Reference Signal |
| RSSI | Received Signal Strength Indicator |
| SCell | Secondary Cell |
| LBT | Listen-before-talk |
| LTE-U | LTE in Unlicensed Spectrum |
| PDCCH | Physical Downlink Control Channel |
| PUSCH | Physical Uplink Shared Channel |
| RRM | Radio Resource Management |
| UCI | Uplink Control Information |

The invention claimed is:

1. A method for determining a channel state performed at a user device (UE) of a radio access network, comprising the UE:
calculating an estimated received signal power based on one or more first subframes;
determining a measured received power based on at least one of the first subframes;
determining one or a plurality of second subframes where reference signals transmitted on an unlicensed carrier by a Secondary Cell (SCell) are available for channel measurement by evaluating the estimated received signal power and the measured received power of the first subframes;
performing a plurality of signal power measurements associated each to one of the second subframes where the reference signals were determined to be available for channel measurement; and
generating a channel state information as a function of the plurality of the signal power measurements;
wherein generating the channel state information comprises determining an average of the plurality of signal power measurements.

2. The method of claim 1, further comprising providing the channel state information to an access node providing the UE access to the radio access network.

3. The method of claim 1, wherein the UE evaluates the estimated received signal power and the measured received power of the first subframes by evaluating a power difference between the estimated received signal power and the measured received power of the first subframes.

4. The method of claim 1, wherein the one or the plurality of second subframes where the reference signals are available for channel measurement are determined by detecting that a power difference between an estimated received signal power and a measured received power associated with respective second subframes does not exceed a certain power threshold.

5. The method of claim 1, wherein the UE:
performs a reference signal received power measurement (RSRP) on cell specific reference symbols (CRS) or on Channel State Information Reference Signals (CSI-RS) in a current subframe; and
compares the RSRP to an average value of a set measurements of previously received subframes.

6. The method of claim 5, wherein, if a power difference exceeds a certain threshold, the measurement of the current subframe is excluded from averaging.

7. The method of claim 1, wherein the UE determines the second subframes where the reference signals are available for channel measurement by determining whether a power variation due to a varying number of licensed-assisted access secondary cells for which the UE is scheduled to receive data, does not exceed a determined threshold.

8. The method of claim 1, wherein the UE determines the second subframes where the reference signals are available for channel measurement by determining whether a power variation due to a varying number of licensed-assisted access secondary cells for which the UE is scheduled to receive data, or on which it has detected a presence of Cell-Specific Reference Signals, does not exceed a determined threshold.

9. The method of claim 1, wherein channel state information is being determined on a radio channel associated to an LTE unlicensed band being controlled by a Listen-Before-Talk mechanism.

10. The method of claim 1, wherein the one or a plurality of subframes are orthogonal frequency division multiplexing symbol intervals.

11. A method performed at a network node (eNB) of a radio access network adapted for communicating with a User Equipment (UE), the method comprising the eNB:
generating information, to be sent to the UE, indicating a plurality of subframes where reference signals transmitted on an unlicensed carrier by a Secondary Cell (SCell) are available for received signal power measurements; and
evaluating a measurement report received from the UE, wherein the report comprises received signal power measurements associated each to one of the subframes;
wherein the eNB utilizes a secondary carrier;

wherein one or a plurality of subframes of the secondary carrier cannot be used for transmitting data by the eNB; and wherein the information to be sent to the UE comprises an identifier of each of these one or plurality of subframes of the secondary carrier.

12. A user equipment (UE), comprising:
processing circuitry;
memory containing instructions executable by the processing circuitry whereby the UE is operative to:
calculate an estimated received signal power based on one or more first subframes;
determine a measured received power based on at least one of the first subframes;
determine one or a plurality of second subframes where reference signals transmitted on an unlicensed carrier by a Secondary Cell (SCell) are available for channel measurement by evaluating the estimated received signal power and the measured received power of the first subframes; and
perform a plurality of signal power measurements associated each to one of the second subframes where the reference signals were determined to be available for channel measurement;
generate a channel state information as a function of the plurality of the signal power measurements;
wherein generating the channel state information comprises determining an average of the plurality of the signal power measurements.

13. The UE of claim 12, wherein the instructions are such that the UE is operative to provide the channel state information to an access node providing the UE access to a radio access network.

14. The UE of claim 12, wherein the instructions are such that the UE is operative to evaluate the estimated received signal power and the measured received power by evaluating a difference between the estimated received signal power and the measured received power the first subframes.

15. The UE of claim 12, wherein the instructions are such that the UE is operative to determine the one or the plurality of second subframes to be used for channel measurement by detecting that a power difference between an estimated received signal power and a measured received power associated with respective second subframes does not exceed a certain power threshold.

16. The UE of claim 12, wherein the instructions are such that the UE is operative to:
perform a reference signal received power measurement (RSRP) on cell specific reference symbols (CRS) or on Channel State Information Reference Signals (CSI-RS) in a current subframe; and
compare the RSRP to an average value of a set RSRP measurements of previously received subframes.

17. The UE of claim 16, wherein the instructions are such that the UE is operative to exclude the current subframe from averaging if a power difference exceeds a certain threshold.

18. The UE of claim 12, wherein the instructions are such that the UE is operative to determine the second subframes where the reference signals are available for channel measurement by determining whether a power variation due to a varying number of licensed-assisted access secondary cells for which the UE is scheduled to receive data does not exceed a determined threshold.

19. The UE of claim 12, wherein the instructions are such that the UE is operative to determine the second subframes where the reference signals are available for channel measurement by determining whether a power variation due to a varying number of licensed-assisted access secondary cells for which the UE is scheduled to receive data, or on which it has detected a presence of Cell-Specific Reference Signals, does not exceed a determined threshold.

20. A network node (eNB) of a radio access network adapted for communicating with a User Equipment (UE) over a communication channel, the eNB comprising:
processing circuitry;
memory containing instructions executable by the processing circuitry whereby the eNB is operative to:
generate information, to be sent to the UE, indicating a plurality of subframes where reference signals transmitted on an unlicensed carrier by a Secondary Cell (SCell) are available for received signal power measurements; and
evaluate a measurement report received from the UE, wherein the report comprises received signal power measurements signal power measurements associated each to one of the subframes;
wherein the eNB utilizes a secondary carrier;
wherein one or a plurality of subframes of the secondary carrier cannot be used for transmitting data by the eNB; and
wherein the information to be sent to the UE comprises an identifier of each of these one or plurality of subframes of the secondary carrier.

21. A non-transitory computer readable recording medium storing a computer program product for controlling a User Equipment (UE) of a radio access network, the computer program product comprising software instructions which, when run on processing circuitry of the UE, causes the UE to:
calculate an estimated received signal power based on one or more first subframes;
determine a measured received power based on at least one of the first subframes;
determine one or a plurality of second subframes where reference signals transmitted on an unlicensed carrier by a Secondary Cell (SCell) are available for channel measurement by evaluating the estimated received signal power and the measured received power of the first subframes;
perform a plurality of signal power measurements associated each to one of the second subframes where the reference signals were determined to be available for channel measurement; and
generate a channel state information as a function of the plurality of the signal power measurements;
wherein the generating the channel state information comprises determining an average of the plurality of the signal power measurements.

22. A non-transitory computer readable recording medium storing a computer program product for controlling a network node of a radio access network adapted for communicating with a User Equipment (UE), the computer program product comprising software instructions which, when run on processing circuitry of the network node, causes the network node to:
generate information, to be sent to the UE, indicating a plurality of subframes where reference signals transmitted on an unlicensed carrier by a Secondary Cell (SCell) are available for received signal power measurements; and evaluate a measurement report received from the UE, wherein the report comprises received signal power measurements associated each to one of the available subframes;
wherein the eNB utilizes a secondary carrier;
wherein one or a plurality of subframes of the secondary carrier cannot be used for transmitting data by the eNB; and
wherein the information to be sent to the UE comprises an identifier of each of these one or plurality of subframes of the secondary carrier.

* * * * *

UNITED STATES PATENT AND TRADEMARK OFFICE
CERTIFICATE OF CORRECTION

PATENT NO. : 11,122,450 B2
APPLICATION NO. : 15/763269
DATED : September 14, 2021
INVENTOR(S) : Mukherjee et al.

Page 1 of 1

It is certified that error appears in the above-identified patent and that said Letters Patent is hereby corrected as shown below:

On the Title Page

In Item (56), under "OTHER PUBLICATIONS", in Column 2, Line 4, delete "V11.A.0" and insert -- V11.4.0 --, therefor.

On Page 2, in Item (56), under "OTHER PUBLICATIONS", in Column 2, Line 7, delete "V11.51)" and insert -- V11.5.0 --, therefor.

In the Specification

In Column 3, Line 18, delete "efficiently" and insert -- efficiency --, therefor.

Signed and Sealed this
Twenty-second Day of February, 2022

Drew Hirshfeld
*Performing the Functions and Duties of the*
*Under Secretary of Commerce for Intellectual Property and*
*Director of the United States Patent and Trademark Office*